United States Patent
Newman

(10) Patent No.: US 6,683,632 B2
(45) Date of Patent: Jan. 27, 2004

(54) METHOD AND SYSTEM FOR PRESENTING SEMILINEAR HIERARCHY

(75) Inventor: Paula S. Newman, Los Altos, CA (US)

(73) Assignee: Xerox Corporation, Stamford, CT (US)

( * ) Notice: Subject to any disclaimer, the term of this patent is extended or adjusted under 35 U.S.C. 154(b) by 479 days.

(21) Appl. No.: 09/732,028

(22) Filed: Dec. 8, 2000

(65) Prior Publication Data

US 2002/0070984 A1 Jun. 13, 2002

(51) Int. Cl.[7] .................................................. G06F 3/00
(52) U.S. Cl. ........................ 345/853; 345/854; 345/841
(58) Field of Search ................................ 345/853, 854, 345/764, 841, 440, 765; 715/514

(56) References Cited

U.S. PATENT DOCUMENTS

| | | | |
|---|---|---|---|
| 5,065,347 A | | 11/1991 | Pajak et al. |
| 5,812,135 A | * | 9/1998 | Kotchey ...................... 345/853 |
| 6,252,597 B1 | * | 6/2001 | Lokuge ........................ 345/841 |
| 6,448,985 B1 | * | 9/2002 | McNally ...................... 345/784 |
| 6,484,190 B1 | * | 11/2002 | Cordes et al. .............. 715/514 |
| 6,563,522 B1 | * | 5/2003 | Rosen et al. ................. 345/854 |

* cited by examiner

Primary Examiner—John Cabeca
Assistant Examiner—Kieu D. Vu
(74) Attorney, Agent, or Firm—Nixon Peabody LLP

(57) ABSTRACT

A method and system for presenting a detail of a tree structure. The presentation of the tree structure does not indent single-successor sequences. One embodiment of the present invention is for use on a computer controlled display system.

22 Claims, 5 Drawing Sheets

| | | | |
|---|---|---|---|
| 0. | Dan Connolly | 04/04/00 | 10:59 |
| 1. | Jonathon Marsh | 04/05/00 | 10:02 |
| 2. | Tim Bray | 04/05/00 | 10:15 |
| 3. | Dave Hollander | 04/05/00 | 10:32 |
| 8. | Jonathon Marsh | 04/05/00 | 12:05 |
| 9. | Jonathon Marsh | 04/05/00 | 12:37 |
| 13. | Dan Connolly | 04/05/00 | 12:55 |
| 14. | Tim Bray | 04/05/00 | 13:03 |
| 15. | Murray Maloney | 04/05/00 | 13:10 |
| 4. | Tim Bray | 04/05/00 | 10:56 |
| 6. | Jonathon Marsh | 04/05/00 | 11:54 |
| 7. | Tim Bray | 04/05/00 | 12:01 |
| 10. | Dan Connolly | 04/05/00 | 12:48 |
| 16. | Murray Maloney | 04/05/00 | 13:10 |
| 5. | Murray Maloney | 04/05/00 | 11:03 |
| 11. | Dan Connolly | 04/05/00 | 12:52 |
| 12. | Tim Bray | 04/05/00 | 12:53 |
| 18. | John Cowan | 04/05/00 | 13:28 |

*FIG. 6*

METHOD AND SYSTEM FOR PRESENTING SEMILINEAR HIERARCHY

FIELD

The present invention relates generally to the field of information display and, in particular, to a system and method for the display of hierarchical information structures.

BACKGROUND

There are many circumstances where trees must be represented as nested lists rather than in graphic form. One method of displaying a nested list is by indenting child nodes under the parent nodes. An example of an application that requires the display of a nested list is a display of thread structures within electronic mail discussion lists. In archives of intensive or broad-membership e-mail lists, many threads contain many messages. Fully nested outline representations of such threads, with each message indented under its predecessor, can be extremely wide. Also, it is desirable to be able to embed textual material, including author, date, time and even message-initial fragments in such displays. When this is done, the fully nested displays may be untenable.

Some conventional e-mail display methods fold back the child nodes to a left margin after a predetermined number of indentations is reached. However, such a display scheme masks the structure of the thread.

Other conventional e-mail archive applications limit the width of the display. For example, Hypermail® provides a "subject" listing in which messages with the same subject line are listed in chronological order. Egroups® provides a subject-based listing in which two levels are used, with messages indented under the corresponding parent if that results in only two levels and if the child node is received very close in time to the parent node.

U.S. Pat. No. 5,065,347 describes a method and apparatus for displaying hierarchic folders to a user-specified width and for "folding back" the display, using icons when the user specified width is reached. All documents cited herein, including the foregoing, are incorporated herein by reference in their entireties.

SUMMARY

A first embodiment of the method and apparatus of the present invention provides a tree structure which does not indent single children within the tree. More particularly, this first embodiment forms a semi-linear tree representation by applying a recursive procedure to the nodes of the tree starting at the root. If a node has multiple successors, then and only then are successors indented, with each successor separated by a divider.

A second embodiment of the method and apparatus of the present invention is an extension of the first embodiment and uses an application-based criteria that determines which subtrees of nodes with multiple children are listed first. This second embodiment lists smaller subtrees first.

BRIEF DESCRIPTION OF THE DRAWINGS

FIG. 5 is a display of the tree of FIG. 3 in accordance with one embodiment of the present invention; and FIG. 6 is a display of a portion of a message thread from an exemplary group mail archive in accordance with the present invention.

DETAILED DESCRIPTION

Figure 1:
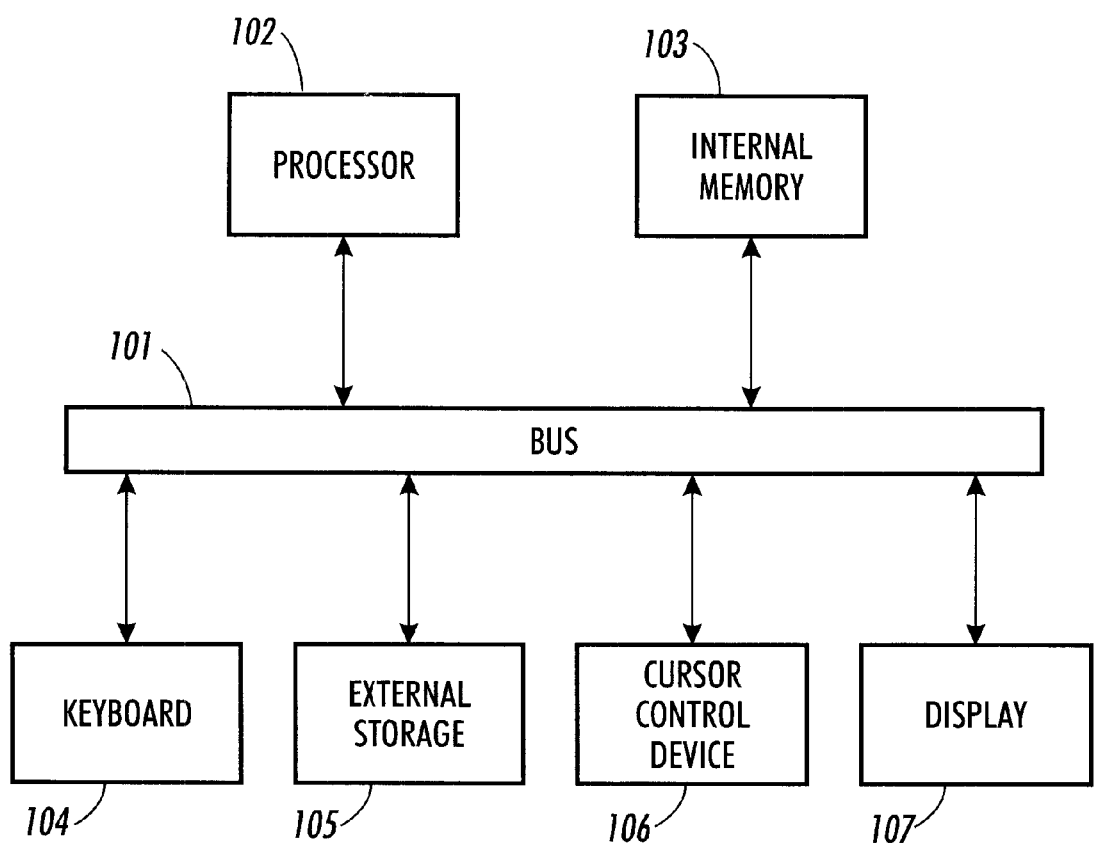
FIG. 1 is a block diagram of a computer controlled display system in an embodiment of the present invention.

The computer based system on which an embodiment of the present invention may be implemented is described with reference to FIG. 1. Referring to FIG. 1, the computer based system includes a plurality of components coupled via a bus 101. The bus 101 may include a plurality of parallel buses (e.g. address, data and status buses) as well as a hierarchy of buses (e.g. a processor bus, a local bus and an I/O bus). The computer system further includes a processor 102 for executing instructions provided via bus 101 from internal memory 103 (note that the internal memory 103 may be a random access memory (RAM), a read only memory (ROM), or a combination of RAM and ROM memories). The processor 102 will be used to perform various operations in support of creating the tree visualizations. Instructions for performing such operations are retrieved from internal memory 103. Such operations that would be performed by the processor 102 are described with reference to FIG. 6. The processor 102 and internal memory 103 may be discrete components or a single integrated device such as an application specification integrated circuit (ASIC) chip.

Also coupled to the bus 101 are a keyboard 104 for entering alphanumeric input, external storage 105 for storing data, a cursor control device 106 for manipulating a cursor, and a display 107 for displaying visual output. The keyboard 104 would typically be a standard QWERTY keyboard but may also be telephone like keypad. The external storage 105 may be fixed or removable magnetic or optical disk drive. The cursor control device 106, e.g. a mouse or trackball, will typically have a button or switch associated with it to which the performance of certain functions can be programmed.

One embodiment of the present invention is a presentation of a tree structure that does not indent single-successor sequences. In this embodiment, the method and apparatus of the present invention forms a semi-linear tree representation by applying the following recursive procedure to the nodes, n, of a tree starting at the root which is presented at an indentation level 0:

(1) if n, displayed at indentation level i, has a single successor, then display that successor at level i immediately under n;

(2) If n has multiple successors, then present the successors under n at indentation level i+1, separated by a divider; and (3) apply the rule to each of the successors of n.

Figure 2:
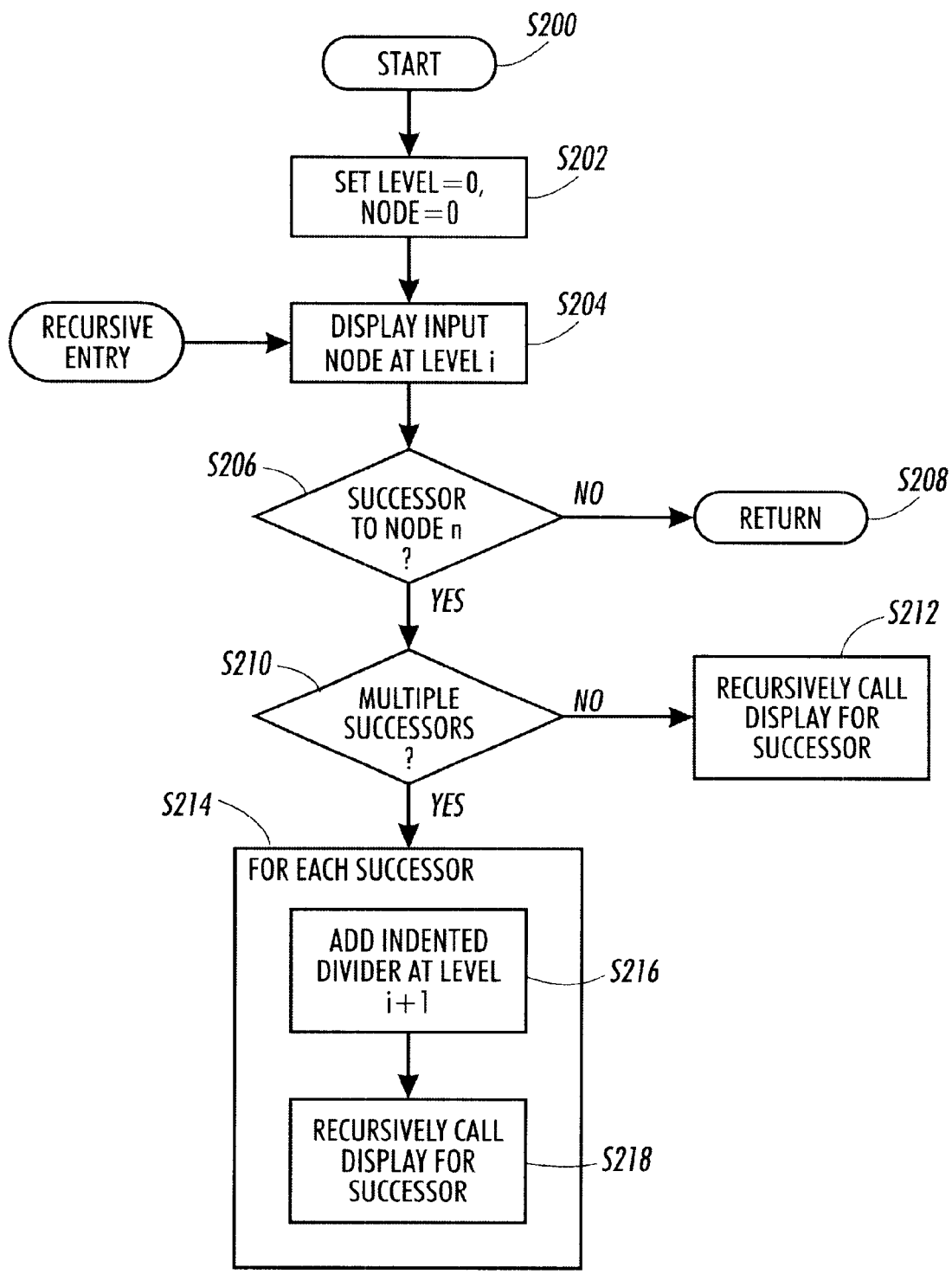
FIG. 2 is a flowchart outlining one exemplary embodiment of a control routine in accordance with the present invention.

Referring now to FIG. 2, which shows a flowchart that outlines one exemplary embodiment of a control routine in accordance with the present invention. The control routine starts at S200 and continues to S202. At S202, the control routine sets the current level i to 0 and the current node level n to 0 and continues to S204. In S204, the control routine displays the input node at level i and continues to S206. In S206, the control routine determines whether there is a successor to the current node n. If, in S206, the control routine determines that there are no successor nodes, then the control routine continues to S208. In S208, the control routine returns control of the display system to the control routine that called the control routine outlined in FIG. 2, or the issuer of a recursive call from S212 or S218.

If, however, in S206, the control routine determines that there is a successor to the current node n, then the control routine continues to S210. In S210, the control routine determines whether the current node has multiple successor nodes. If, in S210, the control routine determines that the current node does not have multiple successor nodes, then the control routine continues to S212. In S212, the control routine recursively calls the display for the successor by returning to S204. If, however, in S210, the control routine determines that the current node has multiple successors, then the control routine continues to S214. S214 that performs two subs S216 and S218 for each successor. In S216, the control routine adds an indented divider at level i+1 and continues to S218. In S218, the control routine recursively calls the display for the successor by entering at S204.

Figure 3:
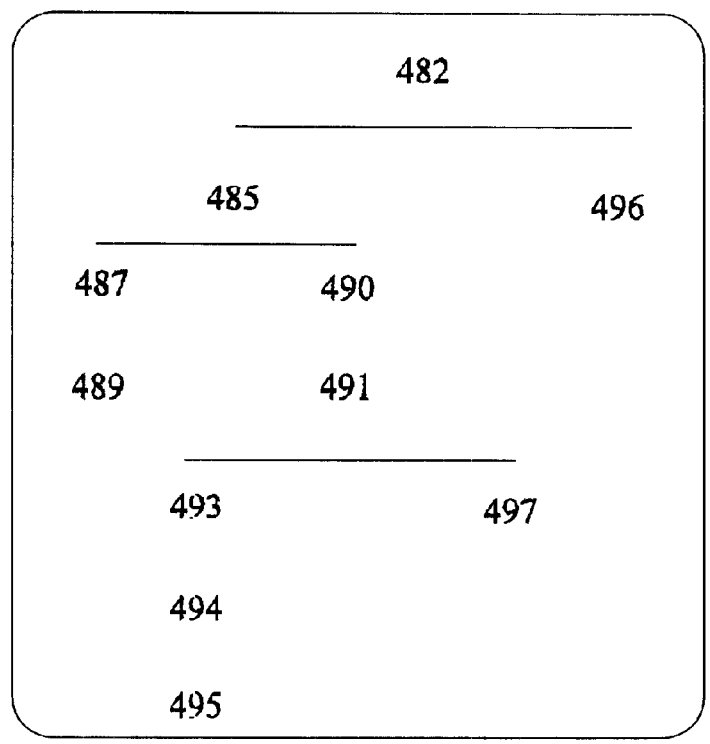
FIG. 3 illustrates a conventional two dimensional tree structure.
Figure 4:
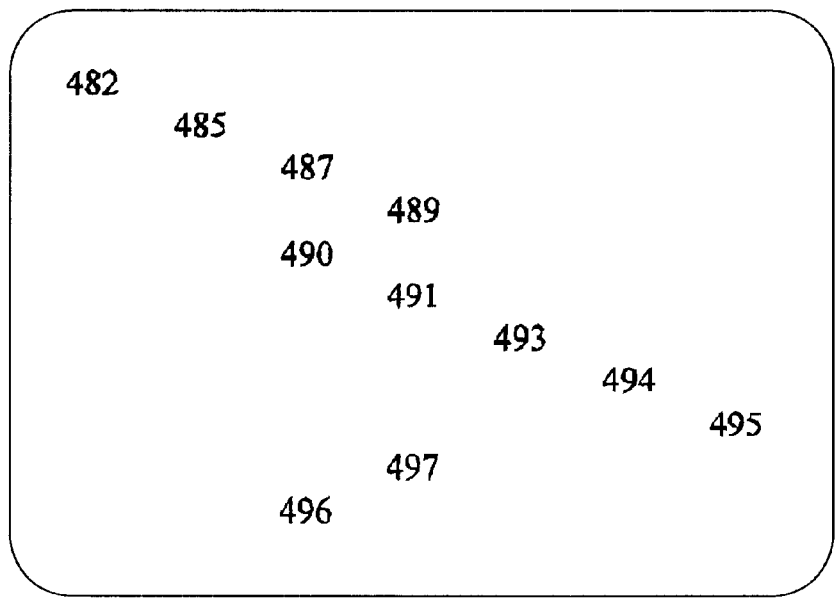
FIG. 4 is a fully indented form of the tree of FIG. 3.
Figure 5:
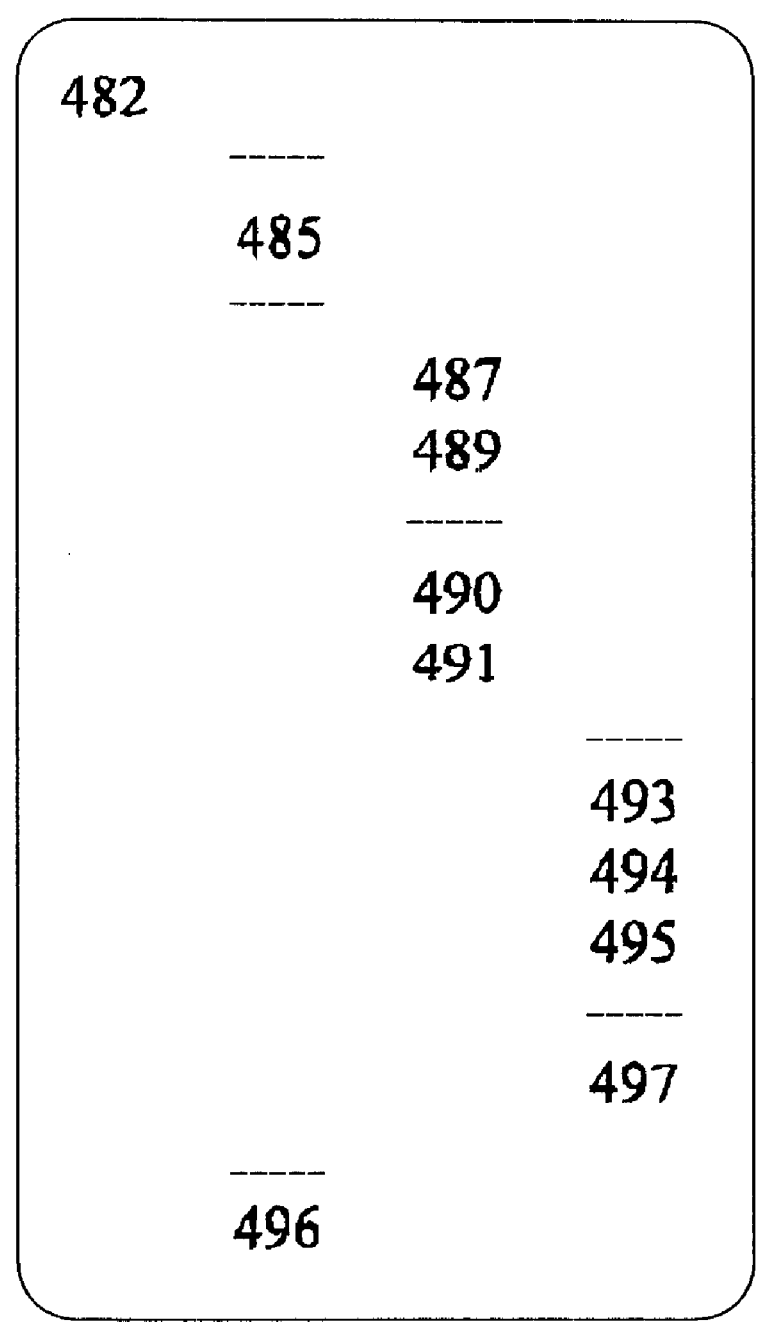

An example of the application of this exemplary embodiment of the present invention is given by transforming the presentation of the tree of FIG. 3 which is also represented by a conventional presentation as shown in FIG. 4, as transformed into a presentation as shown in FIG. 5. FIG. 3 shows nodes 482–495 in a conventional format and FIG. 4 presents the fully indented form of the tree of FIG. 3 with an indent level of 6. FIG. 5 shows the presentation of the same tree in accordance with one exemplary embodiment of the present invention. FIG. 5 has three indent levels which corresponds to the maximum number of multi-child nodes on a path.

The present invention may also be applied in conjunction with application-based criteria that determine which subtrees of a node having multiple children are listed first in a presentation. As an example, smaller subtrees may be listed first in the presentation. An application of this example to e-mail threads, might include a listing of successor subtrees in the order of increasing final dates. This generally has the effect of listing smaller subtrees first, rather than burying them in between larger ones and also of listing the most current subtrees last.

FIG. 6 shows a second exemplary embodiment of the present invention as applied to a first part of a message thread from a W3C XML plenary group mail archive. The message thread has a maximum indentation of three. By contrast, a conventional indented form would have a maximum indentation of 7, for the path 0-1-3-4-6-7-10-16.

As illustrated in FIG. 1, the computer controlled display system is implemented either on a single program general purpose computer, or separate program general purpose computer. However, the computer controlled display system can also be implemented on a special purpose computer, a programmed microprocessor or microcontroller and peripheral integrated circuit element, an ASIC or other integrated circuit, a digital signal processor, a hard wired electronic or logic circuit such as a discrete element circuit, a programmable logic device such as a PLD, PLA, FPGA, PAL, or the like. In general, any device capable of implementing a finite state machine that is in turn capable of implementing the flowchart illustrated in FIG. 2 can be used to implement the computer controlled display system according to this invention.

Furthermore, the disclosed method may be readily implemented in software using object or object-oriented software development environments that provide portable source code that can be used on a variety of computer or workstation hardware platforms. Alternatively, the disclosed computer controlled display system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The computer controlled display systems and methods described above, however, can be readily implemented in hardware and/or software using any known or later-developed systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a microprocessor, or the like. In this instance, the methods and systems of this invention can be implemented as a routine embedded on a personal computer such as a Java® or CGI script, as a resource residing on a server or graphics workstation, as a routine embedded in a dedicated computer controlled display system, a web browser, an computer controlled display for a cellular phone, a PDA, a dedicated computer controlled display system, or the like. The computer controlled display system can also be implemented by physically incorporating the system and method into a software and/or hardware system, such as the hardware and software systems of a dedicated computer controlled display system.

It is, therefore, apparent that there has been provided, in accordance with the present invention, systems and methods for computer controlled display. While this invention has been described in conjunction with embodiments thereof, it is evident that many alternatives, modifications and variations be apparent to those skilled in the applicable arts. Accordingly, Applicants intend to embrace all such alternatives, modifications and variations that follow within the spirit and scope of this invention.

What is claimed is:

1. A computer controlled display system for displaying a two-dimensional visualization of hierarchically related information, the hierarchically related information comprised of a nested list, the computer controlled display system comprising:
a display for displaying structure of the nested list structure on a viewing area of the display;
a processor in communication with the display, wherein the processor applies a recursive procedure to the nested list to form a semi-linear tree representation of the nested list, wherein the semi-linear tree representation only indents multiple-successor sequences.

2. The system of claim 1, wherein the processor is adapted to further order objects in the nested list based upon an application-based criteria.

3. The system of claim 2, wherein the criteria includes the size of each of the objects.

4. The system of claim 1, wherein the semi-linear tree representation includes at least one divider delineating each of a multiple of successors for each node in the nested list.

5. A method for displaying a nested list on a display, the method comprising:
receiving a nested list structure, the nested list structure comprised of a plurality of nodes and levels;
generating a semi-linear tree representation of the nested list structure, wherein the semi-linear tree representation only indents multiple-successor sequences.

6. The method of claim 5, further comprising ordering objects in the nested list based upon an application-based criteria.

7. The method of claim 6, wherein the criteria includes the size of each of the objects.

8. The method of claim 5, wherein the semi-linear tree representation includes at least one divider delineating each of a multiple of successors for each node in the nested list.

9. An information storage media comprising information that displays a two-dimensional visualization of hierarchically related information, the hierarchically related information comprised of a nested list, the media comprising:

information that displays structure of the nested list on a viewing area of the display; and information that applies a recursive procedure to the nested list to form a semi-linear tree representation of the nested list, wherein the semi-linear tree representation only indents multiple-successor sequences.

10. The information storage media of claim 9, further comprising information that orders objects in the nested list based upon an application-based criteria.

11. The information storage media of claim 10, wherein the criteria includes the size of each of the objects.

12. The information storage media of claim 9, wherein the semi-linear tree representation includes at least one divider delineating each of a multiple of successors for each node in the nested list.

13. A display of hierarchically related information comprising a nested list, the display comprising:

a nested list structure display that includes a semi-linear tree representation of the nested list, wherein the semi-linear tree representation only indents multiple-successor sequences.

14. The display of claim 13, wherein objects in the nested list structure display are ordered based upon an application-based criteria.

15. The display of claim 14, wherein the criteria includes the size of each of the objects.

16. The display of claim 13, wherein the semi-linear tree representation includes at least one divider delineating each of a multiple of successors for each node in the nested list.

17. A system for displaying data comprising:

a memory device;

data associated with the memory device; and a processor functionally associated with the memory device and the data, wherein the processor is adapted to apply a recursive procedure to the data to form a semi-linear tree representation and wherein the semi-linear tree representation only indents multiple-successor sequences.

18. The system of claim 17 wherein the semi-linear tree representation is in at least one of a human readable and computer readable format.

19. The system of claim 18 further comprising a medium for outputting the data to a user.

20. The system of claim 19 wherein the medium is at least one of a monitor and a paper further comprising a medium for outputting the data to a user.

21. The system of claim 17 wherein the semi-linear tree representation is a two-dimensional visualization of hierarchically related information, the hierarchically related information comprised of a nested list.

22. The system of claim 17 further comprising a computer controlled display.

* * * * *

UNITED STATES PATENT AND TRADEMARK OFFICE
CERTIFICATE OF CORRECTION

PATENT NO. : 6,683,632 B2
DATED : January 27, 2004
INVENTOR(S) : Paula S. Newman It is certified that error appears in the above-identified patent and that said Letters Patent is hereby corrected as shown below:

Title page,
Item [54], Title, add -- DISPLAYS -- at end.

Column 1,
Line 2, "SEMILINEAR HIERARCHY" should be -- SEMILINEAR HIERARCHY DISPLAYS --.

Signed and Sealed this

Thirteenth Day of June, 2006

JON W. DUDAS
*Director of the United States Patent and Trademark Office*